(12) United States Patent
Metivier

(10) Patent No.: US 8,731,466 B2
(45) Date of Patent: May 20, 2014

(54) SYSTEM FOR PROGRAMMING A LOCK COMPRISING CONTACTLESS NFC COMMUNICATION MEANS

(75) Inventor: Pascal Metivier, Feucherolles (FR)

(73) Assignee: Assa Abloy AB (SE)

( * ) Notice: Subject to any disclaimer, the term of this patent is extended or adjusted under 35 U.S.C. 154(b) by 231 days.

(21) Appl. No.: 13/266,958

(22) PCT Filed: Apr. 28, 2010

(86) PCT No.: PCT/FR2010/050807
§ 371 (c)(1),
(2), (4) Date: Jan. 9, 2012

(87) PCT Pub. No.: WO2010/125307
PCT Pub. Date: Nov. 4, 2010

(65) Prior Publication Data
US 2012/0129451 A1   May 24, 2012

(30) Foreign Application Priority Data

Apr. 30, 2009 (FR) ...................................... 09 52856

(51) Int. Cl.
*H04B 5/00* (2006.01)
*H04M 1/66* (2006.01)
*H04M 1/68* (2006.01)
*H04M 3/16* (2006.01)

(52) U.S. Cl.
USPC ........................................ 455/41.1; 455/410

(58) Field of Classification Search
USPC ...................... 455/41.1, 41.2, 410, 411, 26.1
See application file for complete search history.

(56) References Cited

FOREIGN PATENT DOCUMENTS

GB      2 449 510      11/2008

OTHER PUBLICATIONS

International Search Report for PCT/FR2010/050807, mailed Aug. 13, 2010.
French Search Report for FR Application No. 0952856, dated Nov. 25, 2009.

*Primary Examiner* — Eugene Yun
(74) *Attorney, Agent, or Firm* — Sheridan Ross P.C.

(57) ABSTRACT

The invention relates to a system including a lock (10) provided with electronic NFC transceiver circuits and electric circuits for controlling mechanical locking/unlocking members, and a portable telephone (16) provided with circuits for NFC mode of operation. The telephone comprises means for initializing the lock, said means including means for: downloading, from a remote site (20), an applet and elements required for initializing the lock; verifying, using the telephone, the identifier and the transport key stored in the lock against the downloaded ones; deactivating the transport key of the lock; loading, onto the lock, a unique random algorithm and a cryptographic key that have been downloaded; and generating a message notifying of the termination of the initialization of the lock.

18 Claims, 1 Drawing Sheet

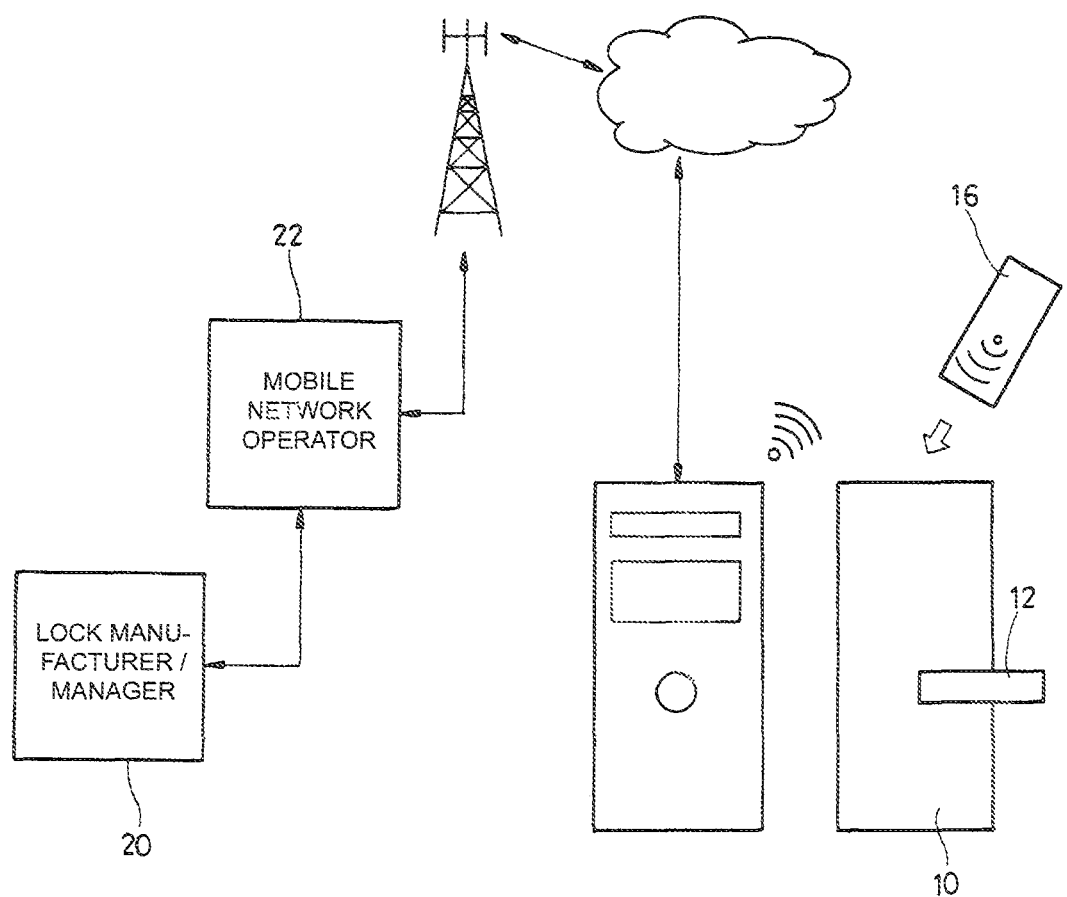

SYSTEM FOR PROGRAMMING A LOCK COMPRISING CONTACTLESS NFC COMMUNICATION MEANS

This application is the U.S. national phase of International Application No. PCT/FR2010/050807, filed 28 Apr. 2010, which designated the U.S. and claims priority to FR Application No. 0952856, filed 30 Apr. 2009, the entire contents of each of which are hereby incorporated by reference.

The invention relates to locks controlled by means of a hand-held object acting as a key, typically in the form of a contactless badge or chip card, which cooperates with the lock by way of a non-galvanic mutual coupling of the NFC (Near Field Communication) type.

With such technology, the coupling between the hand-held object and the lock is made by varying a magnetic field produced by a coil (such technique being referred to as "induction process"). The lock comprises for that purpose an inductive circuit excited by an AC signal that produces a variable magnetic field, able to be detected over a range of at most a few centimeters. The hand-held object located within this range receives the energy of the field (which permits in particular the remote power supply of the hand-held object, the latter having generally no power source of its own) and modulates an inner charge. Such modulation, coded by various data coming from the hand-held object (identifier, encryption key, etc.), is then detected by the lock, which establishes the desired bidirectional communication.

Various coding and encryption techniques exist for securing the contactless communication between the hand-held object and the lock, and protecting the latter against any risk of fraud.

Such protection techniques use algorithms and keys that are implemented in the lock. However, to thwart any risk of fraud, in particular during the transport from the factory to the definitive location, the lock is not originally provided with all the security elements permitting the implementation of these techniques.

Initially, the locks are delivered with provisional cards referred to as "emergency cards", which permit to operate the lock during the time required for the installation thereof, but which do not operate the most elaborate protection techniques; the cryptographic techniques used at this stage are used with a provisory (logical) key referred to as a "transport key", also of temporary nature, or even with a limited service time.

Once the lock is installed, it has to be "programmed" so as to implement therein the algorithms, advanced cryptographic elements and definitive keys permitting to obtain the desired high level of security.

In practice, such programming is often difficult to perform, with risk of errors, even for the lock professionals and even more so for individual users that would desire to install and program their lock themselves. Such complexity and risk of errors are an obstacle to a wide diffusion of these NFC-type contactless locks, despite the numerous advantages they offer, in particular as regards the security.

The object of the invention is to propose a new technique for programming a NFC-type contactless lock, which is easy to implement, even by an uninitiated user, and which moreover does not require any specific material; while keeping a very high level of security all along the sequence of operations, from the transport from the manufacturing factory up to the final programming.

The principle of the invention consists in using for this programming step a portable telephone equipped with a NFC chip and a NFC antenna, with the telephone SIM card being used as an element for securing the data exchanges performed by NFC.

The exchanges between the telephone and the lock may be secured by means of a specific application of the "applet" type, previously downloaded by the telephone. Once loaded and activated, this applet will automatically implement the different steps required for programming the lock, such as downloading an encryption algorithm, keys, identifiers, ... operable to ensure the lock programming in a perfectly secured manner.

An exemplary embodiment of the invention is described with reference to FIG. 1. In this figure, the reference number 10 designates the lock, which externally looks like a unitary element from which appears only a handle 12 and a target area 14 for the NFC communication, i.e. an area against which the handheld object that acts as a key for opening the lock will have to be presented, wherein the object is a contactless card 16 provided with suitable circuits.

When the card 16 is approached, the lock produces an AC magnetic field in order to establish a bidirectional coupling for data exchange with the card 16. The lock may then interrogate this card, according to known techniques, to read therein identifiers, codes, data, authorizations, etc., stored in the memory of the card. These data are verified and, if they match, they control a motor for unlocking the mechanical elements of the lock.

To avoid any fraud attempt, such security techniques cannot be implemented in the lock in the state the latter is at the factory output, during the transport to the final site, and as long as the lock is not definitively installed.

It is only after the lock is installed that the complete security functions will be activated, by a so-called "programming" operation. Meanwhile, the lock can only be operated by means of a card referred to as an "emergency card", which uses only simplified algorithms based on a provisional "transport key".

The way this programming is characteristically performed according to the invention will now be described.

The programming is performed by means of a portable telephone 18 provided, in addition to the telephony circuits for data transmission and reception, with a NFC chip and an induction coil acting as an antenna. Those circuits enable the telephone to operate in an NFC mode, with the SIM card being used as a security element for the NFC communication.

The lock is identified by a non-modifiable unique identifier (hereinafter "the identifier") that permits to recognize it between all the locks, such identifier being of similar nature as the international Mobile Equipment Identity, IMEI, identifier embedded in a GMS or UMTS mobile terminal for the unique and definitive identification of the equipment.

The first operation consists in downloading into the telephone an applet that will permit to automatically execute the sequence of steps required for programming the lock.

Such downloading follows a request sent by the telephone 18 to the remote site 20 of the lock manufacturer or manager, via the operator 22 of the mobile telephone network.

Once downloaded by the telephone 18, the applet is activated, which triggers the transmission from the remote site 20 to the telephone 18 of the different elements required for the programming of each lock, in particular: the recorded lock identifier (or the list of lock identifiers if there are several locks to be programmed), a unique random algorithm, a transport key, a cryptographic key, etc.

Once all these data are loaded into the telephone 18, the user just needs to present the telephone in front of the target area 14 of the lock to be programmed (or of each of the locks to be programmed) in order to establish the bidirectional NFC coupling between the telephone and the lock.

The telephone reads the identifier of the lock to which it is thus coupled: if the identifier read in the lock matches with the identifier received by the telephone from the remote site (or with one of the identifiers, in case there is a plurality of locks to be programmed), then the telephone determines the transport key associated with this identifier.

If the transport key of the lock corresponds to that determined by the telephone, the latter can then begin the actual lock programming process.

First, the telephone resets the lock, by deactivating the transport key and by making the emergency cards delivered with the lock inoperative.

Then, it uploads into the lock the elements required for implementing the security procedures, in particular the unique random algorithm and the definitive cryptographic key. The secured cryptographic procedure can then be activated.

During the execution of the programming process, the user can follow the operation progress by means of a progress bar displayed on the telephone screen.

Once all the operations are correctly executed, the applet generates a message for notifying the completion of the lock programming and displays this message on the telephone screen, indicating that the operation has been successfully performed.

If several locks have to be programmed, the list of the remaining locks to be programmed is displayed on the telephone screen.

The invention claimed is:

1. A system comprising:
   at least one lock provided with electronic circuits for NFC transmission/reception and with electric circuits for the control of locking/unlocking mechanical elements, and
   a portable telephone provided with circuits enabling it to operate in NFC mode,
   said system being characterized in that the telephone comprises means for performing an initial programming of the lock, said means including:
      means for downloading from a remote site an applet operable to automatically execute the sequence of next steps for the lock programming;
      means for downloading from the remote site the elements required for the lock programming, said elements including: a recorded lock identifier, a unique random algorithm, a transport key and a cryptographic key;
      means for establishing a bidirectional NFC coupling between the lock and the telephone;
      means for making the telephone verify the matching of the identifier and the transport key stored in the lock with the identifier and the transport key downloaded from the remote site;
      means for deactivating the transport key of the lock in favor of the unique random algorithm and the cryptographic key;
      means for uploading into the lock the unique random algorithm and the cryptographic key; and
      means for generating a message for notifying the completion of the lock programming.

2. A method of programming a Near Field Communications (NFC)-equipped lock with a telephone, the method comprising:
   downloading an applet on the telephone;
   once the applet is downloaded on the telephone, activating the applet thereby triggering transmission of elements required for programming the NFC-equipped lock;
   receiving, at the telephone, the elements required for programming the NFC-equipped lock;
   storing the elements required for programming the NFC-equipped lock in memory of the telephone via the applet;
   once the elements required for programming the NFC-equipped lock are received and stored in the telephone, presenting the telephone to the NFC-equipped lock to establish an NFC inductive coupling therebetween;
   receiving, at the telephone and via the NFC inductive coupling, a lock identifier and a transport key used to secure the NFC-equipped lock during transport;
   confirming validity of the received lock identifier at the telephone by comparing the received lock identifier with an authorized lock identifier;
   confirming validity of the received transport key at the telephone by comparing the received transport key with an authorized transport key; and
   only in response to confirming validity of the received lock identifier and the received transport key, uploading the elements required for programming the NFC-equipped lock from the telephone to the NFC-equipped lock thereby deactivating and replacing the transport key.

3. The method of claim 2, wherein the elements required for programming the NFC-equipped lock comprise a unique random algorithm and a cryptographic key.

4. The method of claim 2, wherein the elements required for programming the NFC-equipped lock are uploaded to the NFC-equipped lock via the NFC inductive coupling between the telephone and the NFC-equipped lock.

5. The method of claim 2, wherein the received lock identifier is compared with a plurality of authorized lock identifiers each of which correspond to locks authorized to be programmed with the applet.

6. The method of claim 2, wherein the transport key is deactivated by resetting the NFC-equipped lock.

7. The method of claim 6, wherein resetting the NFC-equipped lock further comprises making emergency cards delivered with the NFC-equipped lock inoperative for opening the NFC-equipped lock.

8. The method of claim 2, wherein the elements required for programming the NFC-equipped lock are stored in a secure element of the telephone.

9. The method of claim 8, wherein the secure element comprises a Subscriber Identity Module (SIM) card.

10. The method of claim 2, wherein the applet is downloaded via a mobile telephone network.

11. A non-transitory computer-readable medium comprising processor-executable instructions that, when executed by a processor, program a Near Field Communications (NFC)-equipped lock, the instructions including:
    instructions configured to receive and store elements required for programming the NFC-equipped lock;
    instructions configured to determine than an NFC inductive coupling has been established with the NFC-equipped lock;
    instructions configured to receive, via the NFC inductive coupling, a lock identifier and a transport key used to secure the NFC-equipped lock during transport thereof;
    instructions configured to confirm validity of the received lock identifier by comparing the received lock identifier with an authorized lock identifier;
    instructions configured to confirm validity of the received transport key by comparing the received transport key with an authorized transport key; and instructions configured to upload the elements required for programming the NFC-equipped lock to the NFC-equipped lock thereby deactivating and replacing the transport key.

12. The computer-readable medium of claim 11, wherein the elements required for programming the NFC-equipped lock comprise a unique random algorithm and a cryptographic key.

13. The computer-readable medium of claim 12, wherein the elements required for programming the NFC-equipped lock are uploaded to the NFC-equipped lock via the NFC inductive coupling.

14. The computer-readable medium of claim 11, wherein the received lock identifier is compared with a plurality of authorized lock identifiers each of which correspond to locks authorized to be programmed.

15. The computer-readable medium of claim 11, wherein the transport key is deactivated by resetting the NFC-equipped lock.

16. The computer-readable medium of claim 15, wherein resetting the NFC-equipped lock further comprises making emergency cards delivered with the NFC-equipped lock inoperative for opening the NFC-equipped lock.

17. The computer-readable medium of claim 11, wherein the elements required for programming the NFC-equipped lock are stored in a secure element of a telephone.

18. The computer-readable medium of claim 11, wherein the instructions are stored as an applet in a telephone.

* * * * *